United States Patent
Chemisky et al.

(10) Patent No.: US 11,025,053 B2
(45) Date of Patent: Jun. 1, 2021

(54) SURGE PROTECTION CIRCUIT AND SURGE PROTECTION METHOD

(71) Applicant: Siemens Aktiengesellschaft, Munich (DE)

(72) Inventors: Eric Chemisky, Soultz Sous Forets (FR); Fei Huang Hu, Shanghai (CN); Ling Bao Min, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 305 days.

(21) Appl. No.: 16/068,717

(22) PCT Filed: Jan. 4, 2017

(86) PCT No.: PCT/EP2017/050098
§ 371 (c)(1),
(2) Date: Jul. 9, 2018

(87) PCT Pub. No.: WO2017/118638
PCT Pub. Date: Jul. 13, 2017

(65) Prior Publication Data
US 2019/0027927 A1    Jan. 24, 2019

(30) Foreign Application Priority Data

Jan. 8, 2016 (CN) .......................... 201610012309.1

(51) Int. Cl.
*H02H 9/04* (2006.01)
(52) U.S. Cl.
CPC .................................. *H02H 9/042* (2013.01)

(58) Field of Classification Search
CPC ........... H02H 9/04; H02H 9/041; H02H 9/043
See application file for complete search history.

(56) References Cited

U.S. PATENT DOCUMENTS

| 4,695,916 A | 9/1987 | Satoh et al. | |
|---|---|---|---|
| 4,905,119 A * | 2/1990 | Webb | H02H 9/04 361/111 |

(Continued)

FOREIGN PATENT DOCUMENTS

| CN | 101546909 A | 9/2009 |
|---|---|---|
| CN | 201523227 U | 7/2010 |

(Continued)

OTHER PUBLICATIONS

Chinese Office Action dated Feb. 28, 2019.

*Primary Examiner* — Peter M Novak
(74) *Attorney, Agent, or Firm* — Harness, Dickey & Pierce, P.L.C.

(57) ABSTRACT

A surge protection circuit protection circuit includes a first series-connected line formed by at least two TVSs connected in series. One end of the line is connected to a positive terminal, and another is connected to a negative terminal. A second series-connected line is formed by at least one TSS. One end is connected between the at least two TVSs in the first series-connected line, and another end is grounded. The first line is connected in parallel to a protected circuit. When a differential-mode surge voltage appears at the ends of the first line, a voltage of a backend connection circuit is clamped to a first value. When a common-mode surge voltage appears at the two ends of the first line to the ground end, respectively, voltages to ground of the positive terminal and the negative terminal are reduced to a second value.

14 Claims, 10 Drawing Sheets

(56) References Cited

U.S. PATENT DOCUMENTS

| | | | |
|---|---|---|---|
| 5,359,657 A | 10/1994 | Pelegris | |
| 5,883,775 A | 3/1999 | Maytum | |
| 7,808,751 B2 * | 10/2010 | Chen | H04M 3/18 |
| | | | 361/56 |
| 2009/0244800 A1 * | 10/2009 | Wedley | H04M 19/005 |
| | | | 361/119 |
| 2019/0027927 A1 | 1/2019 | Chemisky et al. | |

FOREIGN PATENT DOCUMENTS

| | | |
|---|---|---|
| CN | 201594732 U | 9/2010 |
| CN | 104485654 A | 4/2015 |
| CN | 106961098 A | 7/2017 |
| GB | 2315634 A | 2/1998 |

* cited by examiner

| Electrical characteristics ($T_A$=25 C) | | | | | | | | | |
|---|---|---|---|---|---|---|---|---|---|
| Part number (Uni) | Part number (Bi) | Marking | | $V_R$ | $V_{BR}@I_T$ | | $I_T$ | $V_C@I_{PP}$ | $I_{PP}$ | $I_R@V_R$ | Authority certification |
| | | UNI | BI | (Volts) | MIN | MAX | (mA) | (V) | (A) | (uA) | |
| SMDJ70A | SMDJ70CA | PGP | DGP | 70.0 | 77.80 | 86.00 | 1 | 113.0 | 26.5 | 2 | X |

Fig. 5

| Electrical characteristics (Tj=25 C) | | | | | | | | | |
|---|---|---|---|---|---|---|---|---|---|
| Part number (Uni) | Part number (Bi) | Marking | | $V_R$ (Volts) | $V_{BR}@I_T$ | | $I_T$ (mA) | $V_C@I_{PP}$ (V) | $I_{PP}$ (A) | $I_R@V_R$ (uA) | Authentic certification |
| | | UNI | BI | | MIN | MAX | | | | | |
| SMCJ54A | SMCJ54CA | GGE | BGE | 54 | 60.00 | 66.30 | 1 | 87.1 | 17.3 | 1 | X |

Fig. 7

| Electrical characteristics | | | | | | | | |
|---|---|---|---|---|---|---|---|---|
| Part number | Marking | $V_{BRM}@I_{BRM}=5uA$ | $V_S@100V/us$ | $I_H$ | $I_S$ | $I_T$ | $V_T@I_T=2.2\text{Amps}$ | Capacitance @ 1 MHz 2V bias | |
| | | V min | V max | mA min | mA max | A max | V max | PF min | PF max |
| P3500SCLRP | P35C | 320 | 400 | 150 | 800 | 2.2 | 4 | 25 | 65 |

Fig. 9

| Surge rate | $I_{pp}$ | | | | | | | | | $I_{TSM}$ 50/60Hz | di/dt |
|---|---|---|---|---|---|---|---|---|---|---|---|
| | 0.2×310¹ / 0.5×700² | 2×10¹ / 2×10³ | 8×20¹ / 1.2×50³ | 10×160¹ / 10×160² | 10×560¹ / 10×560² | 5×320¹ / 9×720² | 10×360¹ / 10×360² | 10×1000¹ / 10×1000² | 5×310¹ / 10×700³ | | |
| Series | A min | A min | A min | A min | A min | A min | A min | A min | A min | A min | A/uA max |
| C | 50 | 500 | 400 | 200 | 150 | 200 | 175 | 100 | 20³ | 30 | 500 |

Fig. 10

SURGE PROTECTION CIRCUIT AND SURGE PROTECTION METHOD

PRIORITY STATEMENT

This application is the national phase under 35 U.S.C. § 371 of PCT International Application No. PCT/EP2017/050098 which has an International filing date of Jan. 4, 2017, which designated the United States of America and which claims priority to Chinese patent application number CN 201610012309.1 filed Jan. 8, 2016, the entire contents of each of which are hereby incorporated herein by reference.

FIELD

At least one embodiment of the present invention generally relates to the technical field of electronics and, in particular, to a surge protection circuit and a surge protection method.

BACKGROUND

In some power supply or signal circuits, surges often appear, which surges are caused by switch and lightning transient over-voltages. The appearance of the surges may cause non-normal operation of or even damage to a device in a circuit.

With respect to an industrial measurement control device under a conventional use condition, for example, a field instrument, a surge voltage which may caused by the environment thereof is relatively low, for example, the surge voltage required by the industrial measurement control device specified by IEC61326 is 1 kV. In order to realize surge protection, a filter circuit may be used to protect the device, and when the surge voltage appears, the surge voltage is filtered by the filter circuit, avoiding too high a voltage of a backend protected circuit, thereby realizing the surge protection.

The prior art is a measure generally adopted when a surge is relatively small, while in certain environments, the surge voltage may rise, and a pure filter circuit is unable to carry out more effective surge protection.

SUMMARY

At least one embodiment of the present invention provides a surge protection circuit and a surge protection method, and provides more effective surge protection.

In the first embodiment, the present invention provides a surge protection circuit, comprising:

a first series-connected line and at least one second series-connected line, wherein, the first series-connected line is formed by at least two transient voltage suppressors (TVSs) connected in series, one end of the first series-connected line being connected to a positive terminal, and the other end being connected to a negative terminal;

the second series-connected line is formed by at least one thyristor surge suppressor (TSS), one end of the second series-connected line being connected between the at least two TVSs in the first series-connected line, and the other end being grounded;

the first series-connected line is connected in parallel to a protected circuit of a device;

when a differential-mode surge voltage appears at the two ends of the first series-connected line, by using the first series-connected line, the differential-mode surge voltage is absorbed, and a voltage of a backend connection circuit is clamped to a first voltage value; and when a common-mode surge voltage appears at the two ends of the first series-connected line to the ground end of the second series-connected line, respectively, by using the first series-connected line and the second series-connected line, the common-mode surge voltage is absorbed, and voltages to ground of the positive terminal and the negative terminal are reduced to a second voltage value.

In the second embodiment, the present invention provides a surge protection method based on the above-mentioned surge protection circuit, comprising: connecting a protected circuit of a device in parallel to a first series-connected line in the surge protection circuit;

when it is detected that a differential-mode surge voltage appears at two ends of the first series-connected line, by using the first series-connected line of the surge protection circuit, absorbing the differential-mode surge voltage, and clamping a voltage of a backend connection circuit to a first voltage value; and when it is detected that a common-mode surge voltage appears at two ends of the first series-connected line to a ground end of the second series-connected line, respectively, by using the first series-connected line and the second series-connected line, absorbing the common-mode surge voltage, and reducing voltages to ground of the positive terminal and the negative terminal to a second voltage value.

BRIEF DESCRIPTION OF THE DRAWINGS

FIG. 5 is a schematic diagram of the electrical characteristics of an SMDJ70CA provided in an embodiment of the present invention;

FIG. 7 is a schematic diagram of the electrical characteristics of an SMCJ54CA provided in an embodiment of the present invention;

FIG. 9 is a schematic diagram of the electrical characteristics of a P3500SCLRP provided in an embodiment of the present invention;

FIG. 10 is a schematic diagram of a surge rate of the P3500SCLRP provided in the embodiment of the present invention.

DETAILED DESCRIPTION OF THE INVENTION

Figure 1:
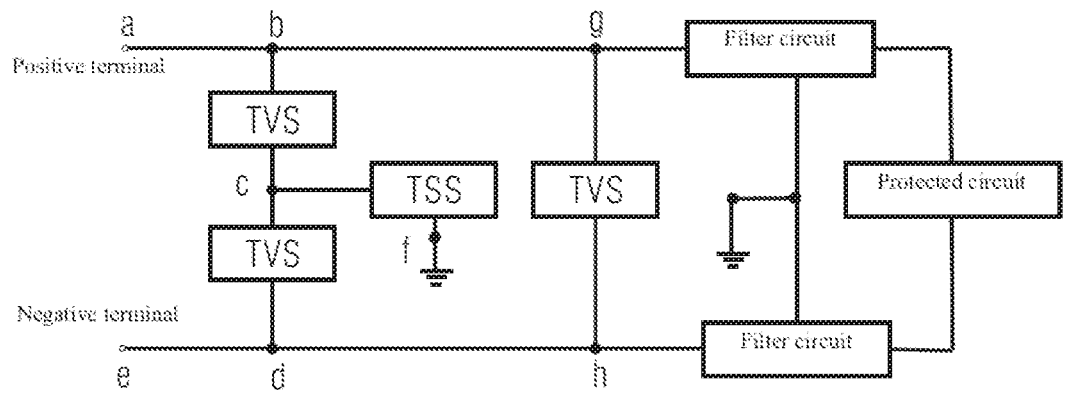
FIG. 1 is a schematic diagram of a surge protection circuit in mode A provided in an embodiment of the present invention.

In the first embodiment, the present invention provides a surge protection circuit, comprising:

a first series-connected line and at least one second series-connected line, wherein, the first series-connected line is formed by at least two transient voltage suppressors (TVSs) connected in series, one end of the first series-connected line being connected to a positive terminal, and the other end being connected to a negative terminal;

the second series-connected line is formed by at least one thyristor surge suppressor (TSS), one end of the second series-connected line being connected between the at least two TVSs in the first series-connected line, and the other end being grounded;

the first series-connected line is connected in parallel to a protected circuit of a device;

when a differential-mode surge voltage appears at the two ends of the first series-connected line, by using the first series-connected line, the differential-mode surge voltage is absorbed, and a voltage of a backend connection circuit is clamped to a first voltage value; and when a common-mode surge voltage appears at the two ends of the first series-connected line to the ground end of the second series-connected line, respectively, by using the first series-connected line and the second series-connected line, the common-mode surge voltage is absorbed, and voltages to ground of the positive terminal and the negative terminal are reduced to a second voltage value.

In an embodiment, the surge protection circuit comprises two of the second series-connected lines therein, wherein all TSSs on the two of the second series-connected lines are connected in series on the first series-connected line; and the first series-connected line is further connected in parallel to at least one TVS.

In an embodiment, the surge protection circuit comprises:
a differential-mode circuit, comprising the at least one TVS connected in parallel to the first series-connected line, wherein, when detecting that the differential-mode surge voltage is greater than a breakdown voltage of the at least one TVS on the differential-mode circuit, the differential-mode circuit absorbs the differential-mode surge voltage, and clamps the voltage of the backend connection circuit to the first voltage value; and a common-mode circuit, comprising from one end of the first series-connected line to a TVS of an upper portion of the first series-connected line to one of the second series-connected lines, and from the other end of the first series-connected line to a TVS of a lower portion of the first series-connected line to the other one of the second series-connected lines, wherein, when detecting that the common-mode surge voltage is greater than a sum of breakdown voltages of the TVSs and switch voltages of the TSSs on the common-mode circuit, the common-mode circuit absorbs the common-mode surge voltage, and reduces the voltages to ground of the positive terminal and the negative terminal to the second voltage value.

In an embodiment, the surge protection circuit comprises one of the second series-connected lines therein, wherein all TSSs on the second series-connected line are not connected in series on the first series-connected line.

In an embodiment, the surge protection circuit comprises:
a differential-mode circuit, comprising the first series-connected line, wherein, when detecting that the differential-mode surge voltage is greater than breakdown voltages of all TVSs on the first series-connected line, the differential-mode circuit absorbs the differential-mode surge voltage, and clamps the voltage of the backend connection circuit to the first voltage value; and a common-mode circuit, comprising from one end of the first series-connected line to a TVS of an upper portion of the first series-connected line to the second series-connected lines, and from the other end of the first series-connected line to a TVS of a lower portion of the first series-connected line to the second series-connected lines, wherein, when detecting that the common-mode surge voltage is greater than a sum of breakdown voltages of the TVSs and switch voltages of the TSSs on the common-mode circuit, the common-mode circuit absorbs the common-mode surge voltage, and reduces the voltages to ground of the positive terminal and the negative terminal to the second voltage value;

wherein the first series-connected line is further connected in parallel to the at least one TVS.

In an embodiment, the surge protection circuit comprises:
a differential-mode circuit, comprising the at least one TVS connected in parallel to the first series-connected line, wherein, when detecting that the differential-mode surge voltage is greater than a breakdown voltage of the at least one TVS on the differential-mode circuit, the differential-mode circuit absorbs the differential-mode surge voltage, and clamps the voltage of the backend connection circuit to the first voltage value; and a common-mode circuit, comprising from one end of the first series-connected line to a TVS of an upper portion of the first series-connected line to the second series-connected lines, and from the other end of the first series-connected line to a TVS of a lower portion of the first series-connected line to the second series-connected lines, wherein, when detecting that the common-mode surge voltage is greater than a sum of breakdown voltages of the TVSs and switch voltages of the TSSs on the common-mode circuit, the common-mode circuit absorbs the common-mode surge voltage, and reduces the voltages to ground of the positive terminal and the negative terminal to the second voltage value.

In an embodiment, the surge protection circuit further comprises at least two filter circuits, wherein
the at least two filter circuits are respectively connected to the two ends of the first series-connected line which are connected in parallel to the protected circuit of the device; and the at least two filter circuits are connected and are both grounded;

wherein the at least two filter circuits are configured to, when detecting that a common-mode surge voltage appears at the two ends of the first series-connected line, filter the common-mode surge voltage that appears;

wherein any one of the TVSs satisfies one or more of the following:
power is not less than a product of a clamping voltage of the TVS and a transient current peak value in a surge condition;

the clamping voltage is less than a first predetermined value;

a breakdown voltage exceeds a maximum working voltage of the protected circuit by a second predetermined value; and leakage current is less than a third predetermined value; and wherein any one of the TSSs satisfies one or more of the following:
a peak turn-on current is greater than a surge current;
a peak turn-off voltage is greater than a fourth predetermined value; and
a switch voltage is less than a fifth predetermined value.

In the second embodiment, the present invention provides a surge protection method based on the above-mentioned surge protection circuit, comprising: connecting a protected circuit of a device in parallel to a first series-connected line in the surge protection circuit;

when it is detected that a differential-mode surge voltage appears at two ends of the first series-connected line, by using the first series-connected line of the surge protection circuit, absorbing the differential-mode surge voltage, and clamping a voltage of a backend connection circuit to a first voltage value; and when it is detected that a common-mode surge voltage appears at two ends of the first series-connected line to a ground end of the second series-connected line, respectively, by using the first series-connected line and the second series-connected line, absorbing the common-mode surge voltage, and reducing voltages to ground of the positive terminal and the negative terminal to a second voltage value.

An embodiment of the present invention provides a surge protection circuit and a surge protection method. By using TVSs to form a first series-connected line and using TSSs to form a second series-connected line, when a differential-mode surge voltage appears at the two ends of the first series-connected line, a high impedance at the two ends of the first series-connected line may be rapidly converted into a low impedance according to the characteristics of the TVS so as to absorb surge power and to clamp a voltage of a backend connection circuit to a first voltage value, and when a common-mode surge voltage appears at the two ends of the first series-connected line to the ground end of the second series-connected line, respectively, the common-mode surge voltage is absorbed, and voltages to ground of the positive terminal and the negative terminal are reduced to a second voltage value so as to provide more effective surge protection.

The technical solutions in the embodiments of the present invention will be described clearly and completely below in combination with the accompanying drawings in the embodiments of the present invention. Obviously, the embodiments described are merely a part of the embodiments of the present invention, rather than all the embodiments. Based on the embodiments of the present invention, all the other embodiments obtained by a person of ordinary skill in the art under the premise of not involving an inventive effort all fall within the scope of protection of the present invention.

One embodiment of the present invention provides a surge protection circuit. The surge protection circuit may comprise: a first series-connected line and at least one second series-connected line, wherein, the first series-connected line is formed by at least two TVSs (Transient Voltage Suppressor) connected in series, one end of the first series-connected line being connected to a positive terminal, and the other end being connected to a negative terminal;

the second series-connected line is formed by at least one TSS (Thyristor Surge Suppressor), one end of the second series-connected line being connected between the at least two TVSs of the first series-connected line, and the other end being grounded;

the first series-connected line is connected in parallel to a protected circuit of a device;

when a differential-mode surge voltage appears at the two ends of the first series-connected line, by using the first series-connected line, the differential-mode surge voltage is absorbed, and a voltage of a backend connection circuit is clamped to a first voltage value; and when a common-mode surge voltage appears at the two ends of the first series-connected line to the ground end of the second series-connected line, respectively, by using the first series-connected line and the second series-connected line, the common-mode surge voltage is absorbed, and voltages to ground of the positive terminal and the negative terminal are reduced to a second voltage value.

According to the above-mentioned embodiments of the present invention, by using TVSs to form a first series-connected line and using TSSs to form a second series-connected line, when a differential-mode surge voltage appears at the two ends of the first series-connected line, a high impedance at the two ends of the first series-connected line may be rapidly converted into a low impedance according to the characteristics of the TVS so as to absorb surge power and to clamp a voltage of a backend connection circuit to a first voltage value, and when a common-mode surge voltage appears at the two ends of the first series-connected line to the ground end of the second series-connected line, respectively, the common-mode surge voltage is absorbed, and voltages to ground of the positive terminal and the negative terminal are reduced to a second voltage value so as to provide more effective surge protection.

In one embodiment of the present invention, the above-mentioned surge protection circuit may comprise the following two modes:

Mode A: the surge protection circuit comprises one second series-connected line, wherein all TSSs on the second series-connected line are not connected in series on the first series-connected line.

Mode B: the surge protection circuit comprises two second series-connected lines, wherein all TSSs on the two second series-connected lines are connected in series on the first series-connected line, and the first series-connected line is further connected in parallel to at least one TVS.

Explanations will be respectively given with respect to implementations of the surge protection circuits in mode A and mode B mentioned above.

With respect to mode A:

In this mode A, please refer to FIG. 1 for the surge protection circuit, and it can be seen from FIG. 1 that the first series-connected line in the surge protection circuit comprises a line a-b-c-d-e, wherein one TVS is connected in series between points b and c, and one TVS is connected in series between points c and d.

It can be seen from FIG. 1 that one second series-connected line included in the surge protection circuit comprises a line c-f, wherein one TSS is connected in series between points c and f.

FIG. 1 is just a possible implementation, wherein the number of TVSs between points b and c is one, the number of TVSs between points c and d is one, and the number of TSSs between points c and f is one. However, in other embodiments of the present invention, the number of TVSs between points b and c and the number of TVSs between points c and d may be two or more, and the two or more TVSs are connected in series; and the number of TSSs between points c and f may be two or more, and the two or more TSSs are connected in series, wherein the number of TVSs between points b and c is equal to the number of TVSs between points c and d, and models thereof are the same.

In this mode A, in one embodiment of the present invention, the above-mentioned first series-connected line and second series-connected line may be used to form a differential-mode circuit and a common-mode circuit, so as to complete differential-mode surge protection and common-mode surge protection, respectively.

The formed differential-mode circuit may comprises two forms:

The first form: the differential-mode circuit may comprise the first series-connected line, wherein, for the differential-mode circuit, please refer to line a-b-c-d-e and line e-d-c-b-a in FIG. 1; and when detecting that the differential-mode surge voltage between points a and e is greater than breakdown voltages VBR of all TVSs on the first series-connected line, the differential-mode circuit absorbs the differential-mode surge voltage, and clamps the voltage of the backend connection circuit to the first voltage value.

Form 2: the differential-mode circuit may comprise at least one TVS connected in parallel to the first series-connected line (please refer to line g-h in FIG. 1), wherein one TVS is included between points g and h. For the differential-mode circuit, please refer to line a-b-g-h-d-e and line e-d-h-g-b-a in FIG. 1; and when detecting that the differential-mode surge voltage is greater than a breakdown voltage VBR of at least one TVS on the differential-mode circuit, the differential-mode circuit absorbs the differential-mode surge voltage, and clamps the voltage of the backend connection circuit to the first voltage value.

FIG. 1 is just a possible implementation, wherein the number of TVSs between points g and h is one. However, in other embodiments of the present invention, the number of TVSs between points g and h may be two or more, and the two or more TVSs are connected in series. When the TVSs between points g and h and the TVSs between points b and c are the same in terms of model, the number of TVSs between points g and h may be less than the number of TVSs between points b and d; and when the TVSs between points g and h and the TVSs between points b and c are not the same in terms of model, the relationship between the number of TVSs between points g and h and the number of TVSs between points b and d may be determined according to the specific model of the TVS, only requiring a guarantee that the total breakdown voltage of the TVSs between points g and h is less than the total breakdown voltage of the TVSs between points b and d.

In this mode A, regardless of whether the differential-mode circuit is in the above-mentioned form 1 or form 2, the common-mode circuit may comprise: from one end of the first series-connected line to the TVS of an upper portion of the first series-connected line to the second series-connected line (please refer to line a-b-c-f in FIG. 1), and, from the other end of the first series-connected line to the TVS of a lower portion of the first series-connected line to the second series-connected line (please refer to line e-d-c-f in FIG. 1); and when detecting that the common-mode surge voltage between points a and f and between points e and f is greater than a sum of the breakdown voltages VBR of the TVSs and the switch voltages VS of the TSSs on the common-mode circuit, the common-mode circuit absorbs the common-mode surge voltage, and reduces the voltages to ground of the positive terminal and the negative terminal to the second voltage value.

Figure 2:
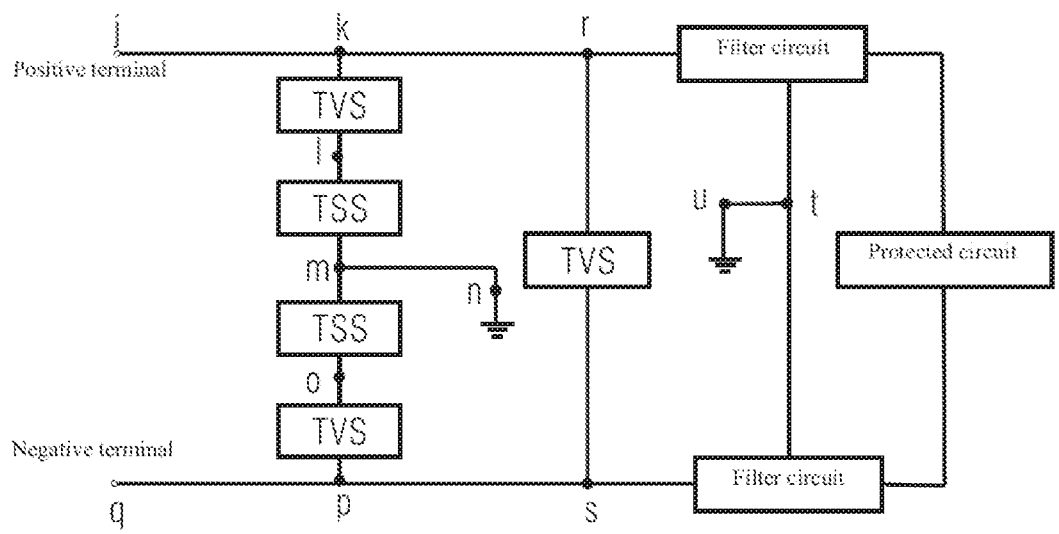
FIG. 2 is a schematic diagram of a surge protection circuit in mode B provided in an embodiment of the present invention.

With respect to mode B:

In this mode B, for the surge protection circuit, please refer to FIG. 2, and it can be seen from FIG. 2 that the first series-connected line in the surge protection circuit comprises line j-k-l-m-o-p-q, wherein one TVS is connected in series between points k and l, and one TVS is connected in series between points o and p.

It can be seen from FIG. 2 that one second series-connected line comprises line l-m-n, and the other second series-connected line comprises line o-m-n, wherein one TSS is connected in series between points l and m, and one TSS is connected in series between points m and o.

It can be seen from FIG. 2 that line r-s comprises one TVS connected in parallel to the first series-connected line.

FIG. 2 is just a possible implementation, wherein the number of TVSs connected in series between points k and l is one, the number of TVSs connected in series between points o and p is one, the number of TVSs connected in series between points r and s is one, the number of TSSs connected in series between points l and m is one, and the number of TSSs connected in series between points m and o is one. However, in other embodiments of the present invention, the number of TVSs between points k and l, the number of TVSs between points o and p and the number of TVSs between points r and s may be two or more, and the two or more TVSs are connected in series; and the number of TSSs between points l and m and the number of TSSs between points m and o may be two or more, and the two or more TSSs are connected in series therebetween, wherein the number of TVSs between points k and l is equal to the number of TVSs between points o and p, and models thereof are the same, and the number of TSSs between points l and m is equal to the number of TSSs between points m and o, and models thereof are the same; when the model of the TVSs between points r and s is the same as the model of the TVSs between points k and l, the number of TVSs between points r and s may not be greater than the number of TVSs between points k and l; and when the model of the TVSs between points r and s is different from the model of the TVSs between points k and l, the relationship between the number of TVSs between points r and s and the number of TVSs between points k and l may be determined according to the specific model of the TVSs, only requiring a guarantee that the total breakdown voltage of the TVSs between points r and s is not greater than the total breakdown voltage of the TVSs between points k and p.

In this mode B, in one embodiment of the present invention, the above-mentioned first series-connected line and second series-connected line may be used to form a differential-mode circuit and a common-mode circuit, so as to complete differential-mode surge protection and common-mode surge protection, respectively.

The formed differential-mode circuit comprises the at least one TVS connected in parallel to the first series-connected line (please refer to line j-k-l-m-o-p-q and line q-p-o-m-l-k-j in FIG. 2); and, when detecting that the differential-mode surge voltage between points j and q is greater than the breakdown voltage VBR of the at least one TVS on the differential-mode circuit, the differential-mode circuit absorbs the differential-mode surge voltage, and clamps the voltage of the backend connection circuit to the first voltage value.

The formed common-mode circuit comprises from one end of the first series-connected line to the TVS of the upper portion of the first series-connected line to one second series-connected line (please refer to line j-k-l-m-n in FIG. 2), and from the other end of the first series-connected line to the TVS of the lower portion of the first series-connected line to another second series-connected line (please refer to line q-p-o-m-n in FIG. 2); and, when detecting that the common-mode surge voltage between points j and n and between points q and n is greater than the sum of the breakdown voltages $V_{BR}$ of the TVSs and the switch voltages $V_S$ of the TSSs on the common-mode circuit, the common-mode circuit absorbs the common-mode surge voltage, and reduces the voltages to ground of the positive terminal and the negative terminal to the second voltage value.

With respect to mode A and mode B mentioned above: the first voltage value is required to be slightly greater than a working voltage of the backend connection circuit, and the second voltage value is the sum of the clamping voltages of all TVSs and the turn-on voltages of all TSSs on the common-mode circuit.

In one embodiment of the present invention, the surge protection circuit in the above-mentioned mode A and the surge protection circuit in the above-mentioned mode B may be referred to as a first level protection circuit.

In one embodiment of the present invention, both the surge protection circuits in the above-mentioned mode A and the above-mentioned mode B may further comprise a second level protection circuit.

The second level protection circuit may comprise at least two filter circuits. When the first level protection circuit is in the above-mentioned mode A, for the second level protection circuit, please refer to FIG. 1; and when the first level protection circuit is in the above-mentioned mode B, for the second level protection circuit, please refer to FIG. 2, wherein the second level protection circuits in FIG. 1 and FIG. 2 may be the same. The at least two filter circuits are respectively connected to the two ends of the first series-connected line which are connected in parallel to the protected circuit of the device, and the at least two filter circuits are connected and are both grounded.

Taking FIG. 2 as an example, explanations will be given with respect to the second level protection circuit.

It can be seen from FIG. 2 that in one embodiment of the present invention, one filter circuit is included between points r and t, and one filter circuit is included between points s and t. However, in other embodiments of the present invention, the number of filter circuits included between points r and t and between points s and t may be two or more, and the two or more filter circuits are connected in series.

In the second level protection circuit, in one embodiment of the present invention, the common-mode circuit may be formed by utilizing the above-mentioned two filter circuits, wherein the common-mode circuit and the common-mode circuit in the first level protection circuit complete common-mode surge protection collectively.

The formed common-mode circuit comprises: from one end of the first series-connected line to one filter circuit (please refer to line j-k-r-t-u in FIG. 2), and from the other end of the first series-connected line to the other filter circuit (please refer to line q-p-s-t-u in FIG. 2). When detecting that the common-mode surge voltage appears at the two ends of the first series-connected line, and the common-mode surge voltage is not greater than the sum of the breakdown voltages of all TVSs and the switch voltages of all TSSs on the common-mode circuit, the common-mode circuit filters the common-mode surge voltage that appears.

Specifically, according to the above-mentioned first level protection circuit and the second level protection circuit, operation principles of the differential-mode surge protection and the common-mode surge protection of the surge protection circuit are respectively shown as follows:

The differential-mode surge protection: when a differential-mode surge appears between the positive terminal and the negative terminal of the surge protection circuit, and the differential-mode surge is greater than the breakdown voltages $V_{BR}$ of all TVSs on the differential-mode circuit in the first level protection circuit, all the TVSs on the differential-mode circuit in the first level protection circuit clamp the voltage of the backend connection circuit to the first voltage value.

The common-mode surge protection: when a common-mode surge appears at the positive terminal and the negative terminal of the surge protection circuit to a ground end, respectively, and the common-mode surge voltage is not greater than the sum of the breakdown voltages $V_{BR}$ of all TVSs and the switch voltages $V_S$ of all TSSs on the common-mode circuit in the first level protection circuit, the common-mode circuit in the second level protection circuit works, and at this moment, the common-mode circuit in the second level protection circuit filters the common-mode surge voltage; and when the common-mode surge voltage is greater than the sum of the breakdown voltages $V_{BR}$ of all the TVSs and the switch voltages $V_S$ of all the TSSs on the common-mode circuit in the first level protection circuit, at this moment, the common-mode circuit in the first level protection circuit works, and the common-mode circuit in the first level protection circuit absorbs the common-mode surge voltage, and reduces the voltages to ground of the positive terminal and the negative terminal to the second voltage value.

Figure 3:
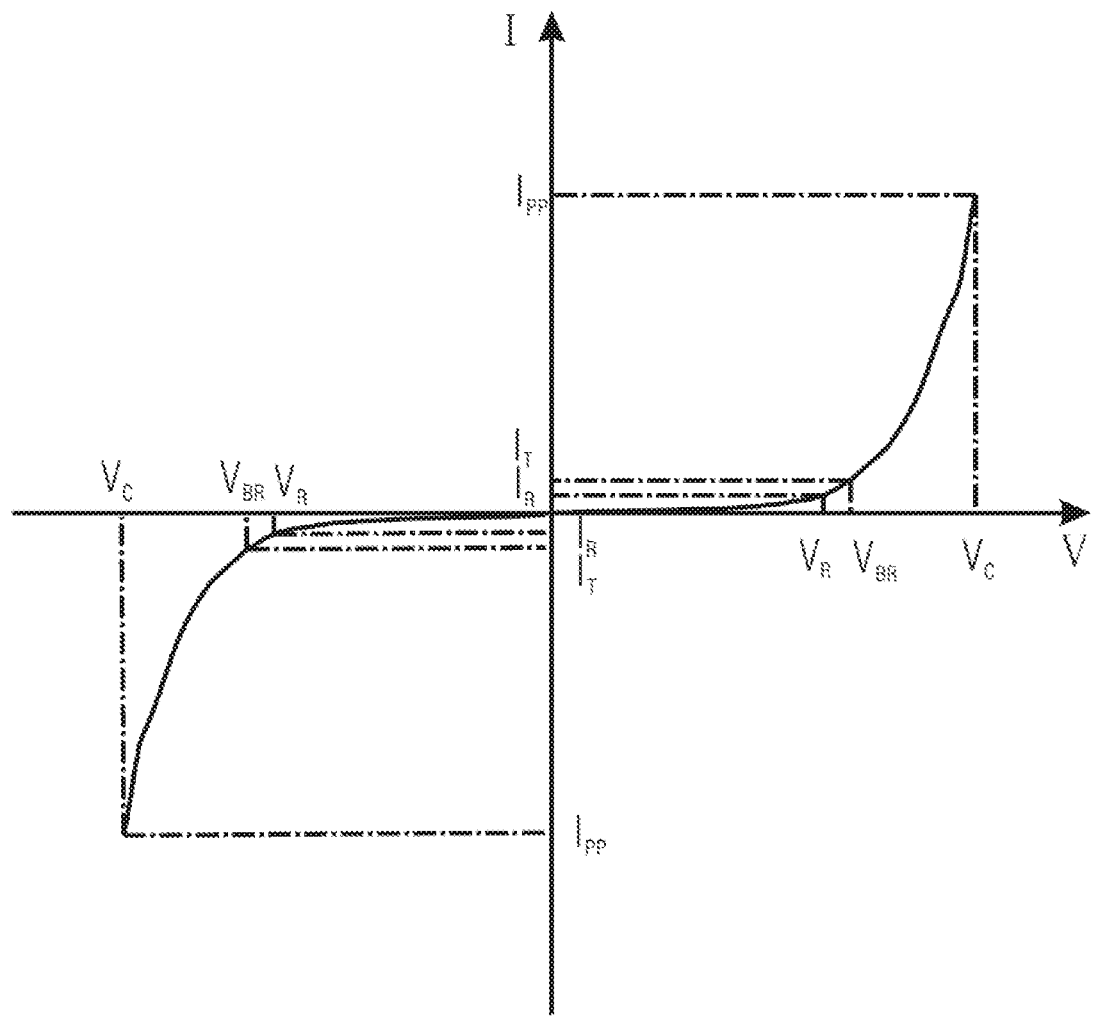
FIG. 3 is a schematic diagram of a current-voltage characteristic curve of a TVS provided in an embodiment of the present invention.
Figure 4:
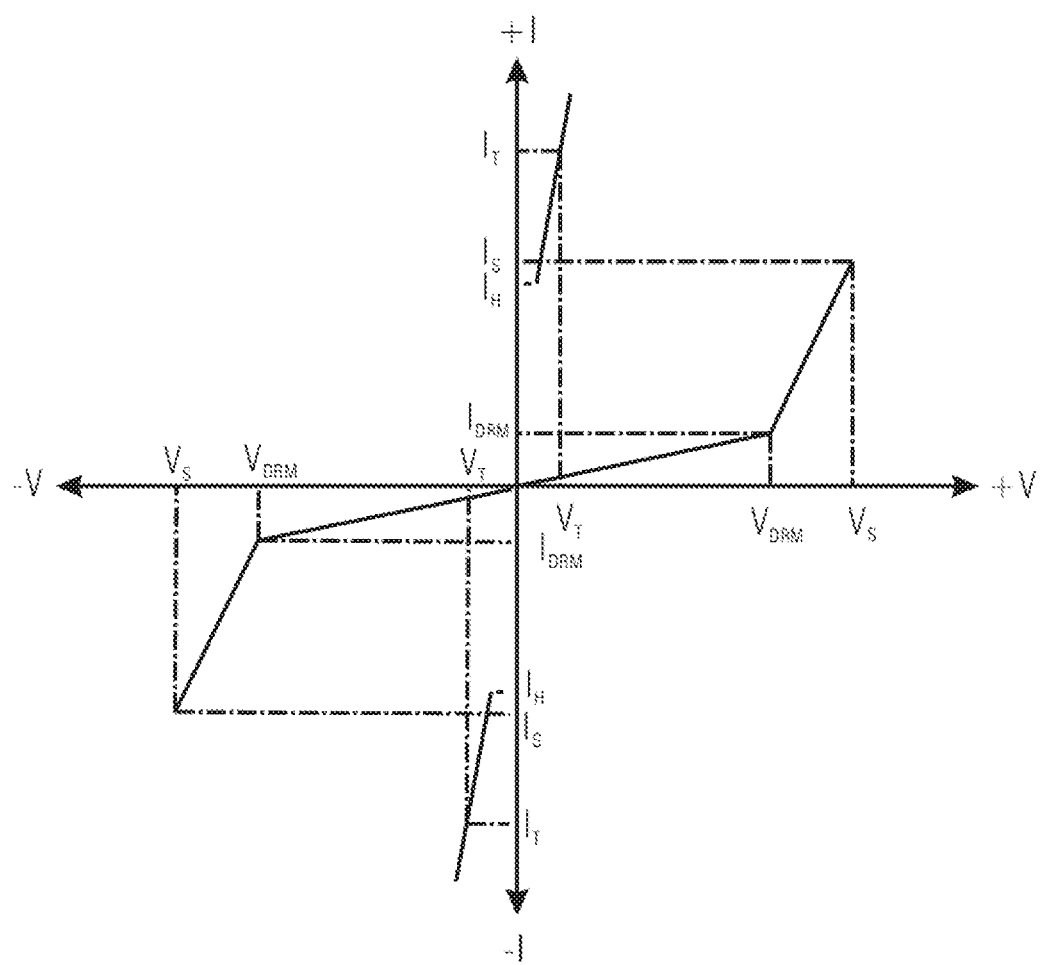
FIG. 4 is a schematic diagram of a current-voltage characteristic curve of a TSS provided in an embodiment of the present invention.

In one embodiment of the present invention, models of the TVSs and the TSSs in the surge protection circuit need to be selected, and when selecting the TVSs and the TSSs, selection needs to be performed according to the current-voltage characteristics of the TVSs and the TSSs, the surge protection and the protected circuit, wherein the current-voltage characteristic curve of the TVS is shown in FIG. 3, and the current-voltage characteristic curve of the TSS is shown in FIG. 4.

Any one of the TVSs is required to satisfy one or more of the following:

1. A TVS with a large power should be selected, wherein the power of the TVS is not less than a product of the clamping voltage $V_C$ of the TVS and the transient current peak value in a surge condition.

2. A TVS with a small clamping voltage $V_C$ should be selected, wherein the clamping voltage $V_C$ of the TVS is less than a first predetermined value. For example, the first predetermined value is 120 V.

3. A breakdown voltage $V_{BR}$ which exceeds a maximum working voltage of the protected circuit by a second predetermined value should be selected.

4. A leakage current is less than a third predetermined value. Since the leakage current has a direct effect on the accuracy of a differential circuit, the smaller the leakage current is, the higher the accuracy of the differential circuit is; and since the differential circuit in the surge protection circuit comprises TVSs, TVSs with relatively small leakage current should be selected so as to enable the leakage current of the differential circuit to be relatively small, for example, the third predetermined value may be 3 uA.

Any one of the TSSs is required to satisfy one or more of the following:

1. A peak turn-on current ($I_{PP}$) is greater than a surge current, wherein the surge current is equal to the surge voltage divided by a resistance value of the protected circuit.

2. A peak turn-off voltage ($V_{DRM}$) is greater than a fourth predetermined value. A TSS with a high $V_{DRM}$ is selected to obtain a sufficient insulated voltage, and the insulated voltage on the common-mode circuit needs to satisfy an insulation test of 500 V AC/700 V DC, wherein the insulated voltage required on the common-mode circuit may be realized by using at least one TSS in the common-mode circuit, and then the insulated voltage on the common-mode circuit is equal to a sum of reverse turn-off voltages $V_R$ of all TVSs and peak turn-off voltages $V_{DRM}$ of all TSSs on the common-mode circuit.

3. A switch voltage ($V_S$) is less than a fifth predetermined value. Since, when the common-mode surge voltage is not greater than the sum of the breakdown voltages $V_C$ of all TVSs and the switch voltages $V_S$ of all TSSs on the common-mode circuit in the first level protection circuit, the common-mode protection is realized by the common-mode circuit of the second level protection circuit, and the greater the sum of the breakdown voltages $V_C$ of all TVSs and the switch voltages $V_S$ of all TSSs on the common-mode circuit in the first level protection circuit is, the more difficult it is to realize the filter circuit in the second level protection circuit, and therefore it is required to guarantee that the switch voltages $V_S$ of the TSS are as small as possible.

With respect to the leakage current of the TSS: since the TSS will not have an effect on the accuracy of the differential circuit, it is unnecessary to consider the leakage current of the TSS.

In one embodiment of the present invention, the positive terminal and the negative terminal may be two ends of a power supply, and may also be a terminal connected with a front end circuit, wherein what is input into the positive terminal is a positive signal, and what is input into the negative terminal is a negative signal.

In order to make the objectives, technical solutions and advantages of embodiments of the present invention more clear, taking a protected circuit with the resistance value being 42 ohm and needing to pass a surge voltage test of 6 KV 1.2/50 us as an example below, the surge protection circuit comprising the differential-mode circuit in form 2 in mode A in an embodiment of the present invention will be further described in detail.

In the first level protection circuit: two TVSs are selected to be used on the first series-connected line and one TVS is used on the upper portion of the first series-connected line, and the other TVS is used on the lower portion of the first series-connected line in FIG. 1, wherein an SMDJ70CA may be selected as the model of the TVS. Two TSSs connected in series are used on the second series-connected line in FIG. 1, wherein a P3500SCLRP may be selected as the model of each TSS. The number of the at least one TVS connected in parallel to the first series-connected line is selected to be one in FIG. 1, wherein an SMCJ54CA may be selected as the model thereof.

Figure 6:
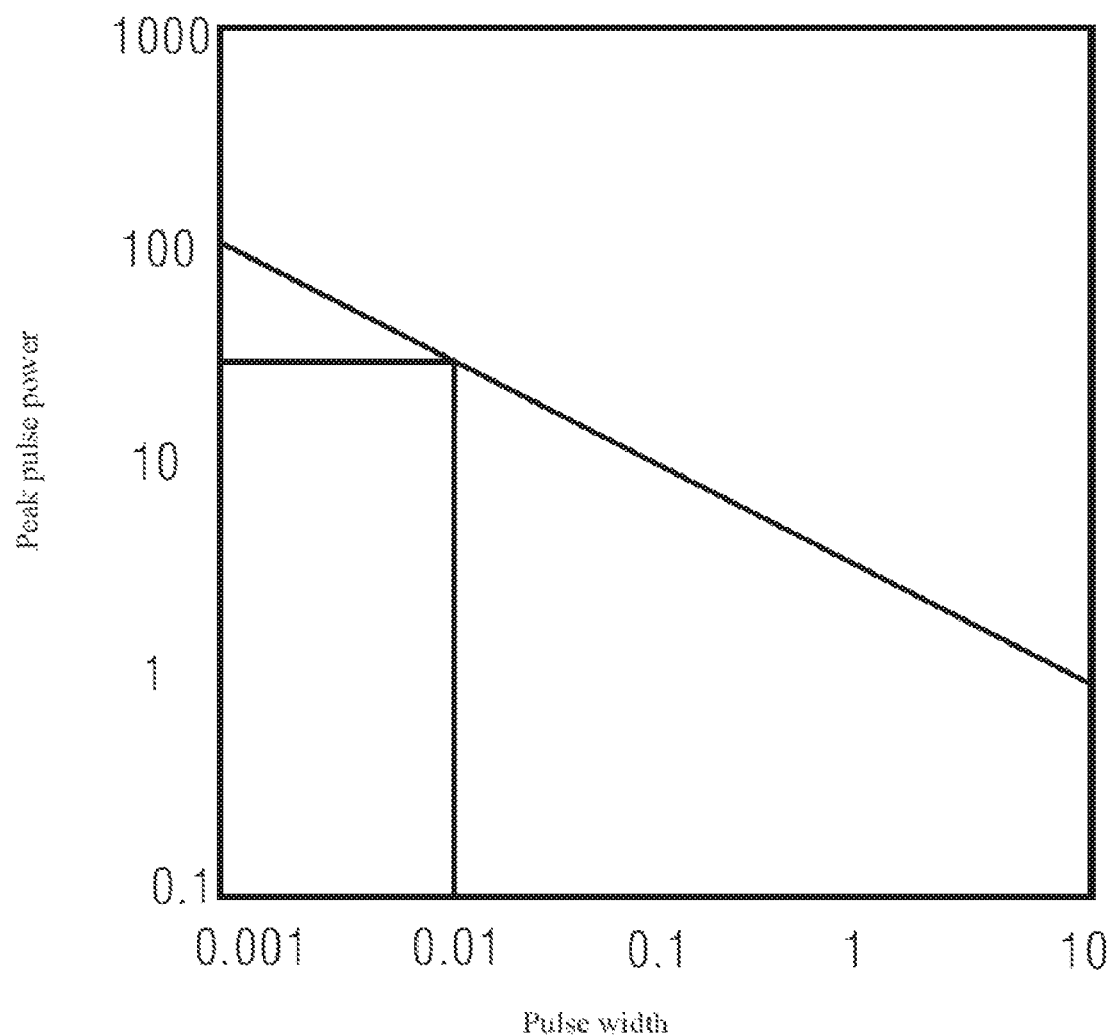
FIG. 6 is a schematic diagram of a peak pulse power and rate of the SMDJ70CA provided in the embodiment of the present invention.

Please refer to FIGS. 5 and 6, which are a schematic diagram of the electrical characteristics and a schematic diagram of a peak pulse power and rate of the SMDJ70CA, respectively.

Figure 8:
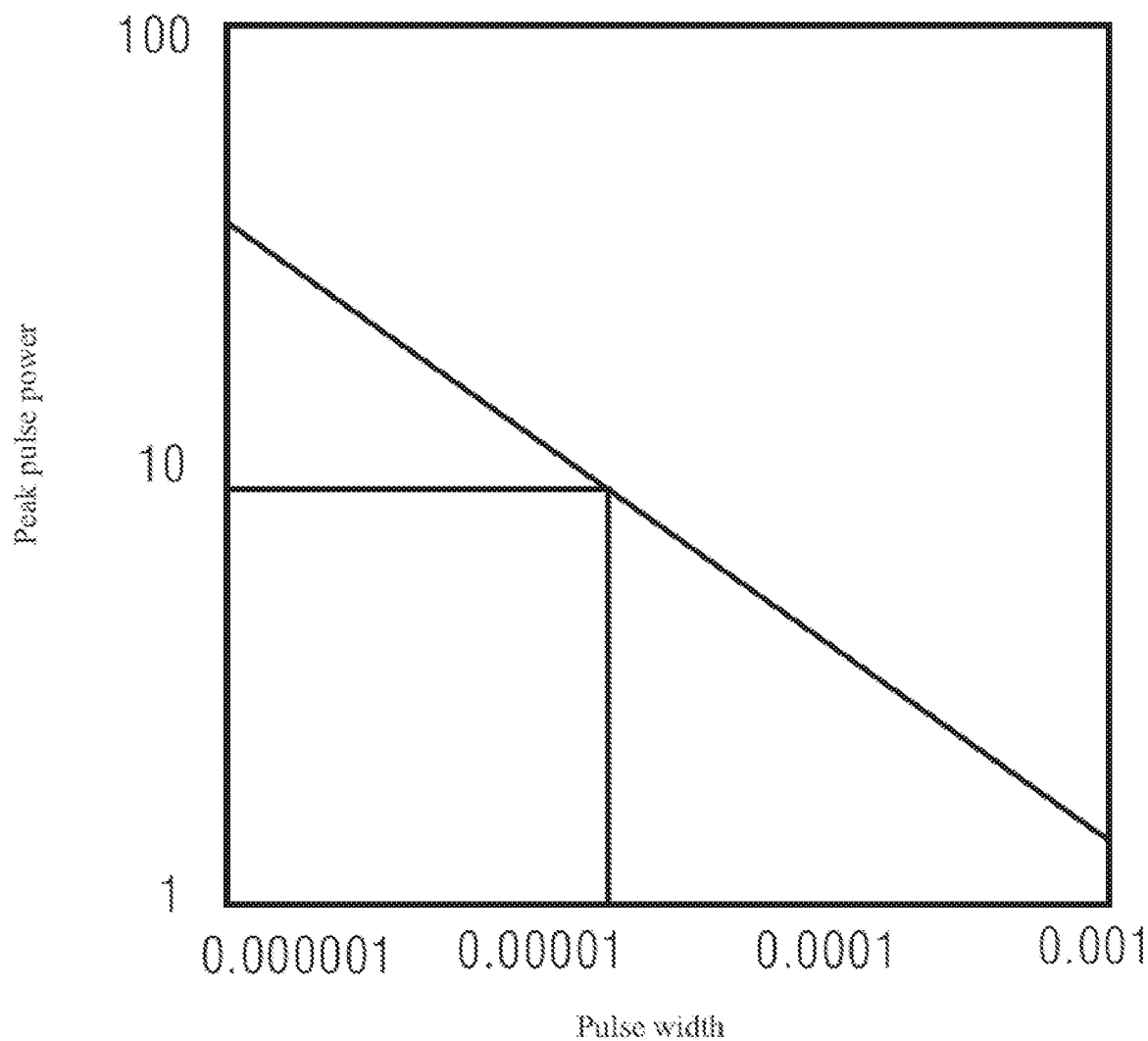
FIG. 8 is a schematic diagram of a peak pulse power and rate of the SMCJ54CA provided in the embodiment of the present invention.

Please refer to FIGS. 7 and 8, which are a schematic diagram of the electrical characteristics and a schematic diagram of a peak pulse power and rate of the SMCJ54CA, respectively.

Please refer to FIGS. 9 and 10, which are a schematic diagram of the electrical characteristics and a schematic diagram of a surge rate of the P3500SCLRP, respectively.

In the second level protection circuit: please refer to FIGS. 5 and 9, and since the sum of the breakdown voltages of all TVSs and the switch voltages of all TSSs on the common-mode circuit in the first level protection circuit is: the sum (86+800=886 V) of the breakdown voltage value of one TVS ($V_{BR}$=86 V) and the total switch voltage of two TSSs ($V_S$+$V_S$=400+400=800 V), and when the common-mode surge voltage is not greater than 886 V, the common-mode circuit in the second level protection circuit is required to work, the filter circuit on the common-mode circuit in the second level protection circuit is required to realize filter protection on a highest common-mode surge voltage which is 886 V, wherein an inductive-capacitive circuit may be required to realize the filter circuit, and a high voltage capacitor is required to be selected as the capacitor in the filter circuit, for example, a capacitor of 1 KV is required to realize the filter circuit.

Figure 11:
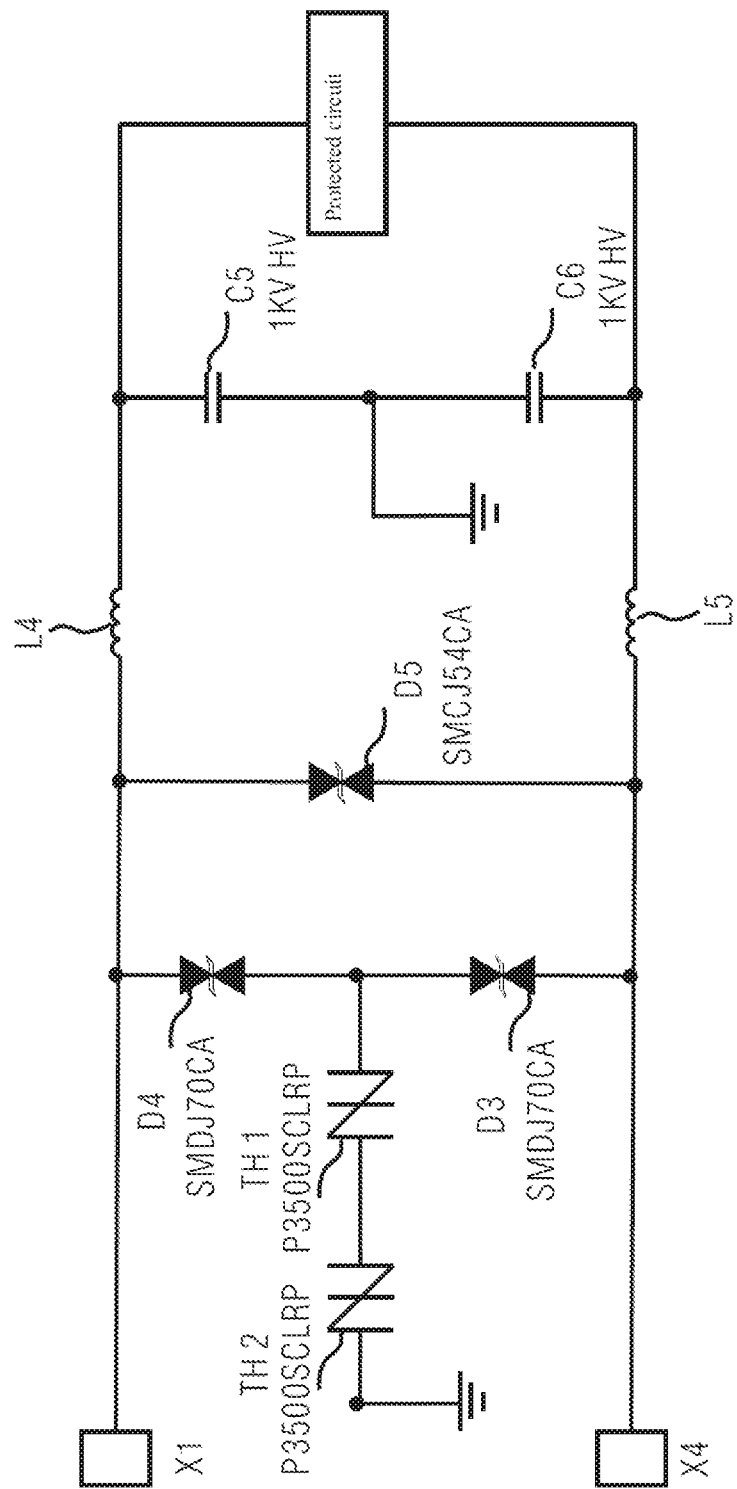
FIG. 11 is a schematic diagram of a surge protection circuit example provided in an embodiment of the present invention.

In one embodiment of the present invention, according to selections of various devices in the above-mentioned first level protection circuit and the second level protection circuit, please refer to FIG. 11 which is a completely constructed surge protection circuit. Working processes of differential-mode surge protection and common-mode surge protection of the surge protection circuit are respectively shown as follows:

For the differential-mode surge protection:

the working process of the differential-mode surge protection may comprise: when the differential-mode surge voltage between X1 and X4 is greater than the breakdown voltage $V_{BR}$ (66.3 V) of D5, D5 clamps the differential-mode surge voltage so as to clamp the voltage of the backend connection circuit to the first voltage value.

In one embodiment of the present invention, it can be seen from FIG. 8 that the power of an SMCJ54CA @ 10/1000 ms of D5 is 1.5 kW, which is equivalent to a surge of 8 kW @ 8/20 us. Therefore, please refer to FIG. 7, a peak pulse current IPP of the SMDJ54CA at 8/20 us is: the power at 8/20 us divided by the clamping voltage VC, i.e., 8000/87=90 A, which may realize the differential-mode surge protection of the protected circuit with the transient current peak value not greater than 90 A in a surge condition, wherein a product of the transient current peak value and the resistance value of the protected circuit is 90×42=3.78 KV, and therefore the surge voltage protection on the protected circuit within 3 KV may be realized.

In one embodiment of the present invention, with respect to the surge protection circuit shown in FIG. 11, the leakage current on the differential-mode circuit thereof is determined by the leakage currents of D3, D4 and D5; it can be seen from FIG. 5 that the maximum leakage current value IR of D3 or D4 is 2 uA, and therefore the maximum leakage current value on line X1-a-b-c-X4 is 2 uA; and it can be seen from FIG. 7 that the maximum leakage current value IR of D5 is 1 uA, and therefore the maximum leakage current value on line X1-a-e-f-c-X4 is 1 uA, and therefore the maximum leakage current on the differential-mode circuit is 2+1=3 uA.

For the common-mode surge protection:

Since a minimum reverse turn-off voltage VR of the TVS SMDJ70CA is 70 V, and a peak turn-off voltage (VDRM) of the TSS P3500SCLRP is 320 V, an insulated voltage on the common-mode circuit is 320×2+70=710 V, which may satisfy the insulation test of 500 V AC/700 V DC.

A maximum switch voltage VS of the TSS P3500SCLRP is 400 V @ 100 V/us, and a maximum value of the breakdown voltage $V_{BR}$ of the TVS SMDJ70CA is 86 V, and a minimum value of the breakdown voltage $V_{BR}$ is 77.8 V, and therefore the common-mode circuit in the second level protection circuit works before the common mode surge voltage rises to 400×2+86=886 V @ 100 V/s, and the common-mode circuit of the first level protection circuit works after the common mode surge voltage rises to 886 V @ 100 V/s and before the common mode surge voltage drops to 400×2+77.8=877.8 V @ 100 V/s, and the common-mode circuit of the second protection circuit works after the common mode surge voltage drops to 877.8 V @ 100 V/s.

It can be seen from FIG. 6 that the power of the TVS SMDJ70CA at @ 10/1000 ms is 3 kW, which is equivalent to a surge of 30 kW @ 8/20 us. Therefore, the peak pulse current $I_{PP}$ of the TVS SMDJ70CA when the surge rate is 8/20 us is: the power at 8/20 us divided by the clamping voltage $V_C$, i.e., 30 kW/113 V=265 A, wherein the transient current peak value of the protected circuit in the surge of 6 KV is: 6000 V/42 ohm=150 A. Therefore, the peak pulse current $I_{PP}$ of the TVS SMDJ70CA when the surge rate is 8/20 us is greater than the transient current peak value of the protected circuit in the surge of 6 KV, and the current of the TSS P3500SCLRP when the surge rate is 8/20 us is 400 A (please refer to FIG. 10) is also greater than the transient current peak value 150 A of the protected circuit in the surge of 6 KV, and therefore the common-mode circuit in the first level protection circuit may realize the common-mode surge protection on the protected circuit.

The working process of the common-mode surge protection may comprise: when the common-mode surge voltage of X1 to ground end and X4 to ground end is in a rising edge, and the common-mode surge voltage is not greater than 886 V @ 100 V/s, the common-mode surge voltage is filtered by the common-mode circuit in the second level protection circuit, and, when the common-mode surge voltage rises to greater than 886 V @ 100 V/s, the common-mode surge voltage is absorbed by the common-mode in the first level protection circuit, and the voltages of the X1 to ground end and the X4 to ground end are reduced to the second voltage value, wherein the second voltage value is the clamping voltage $V_C$ of D4 or D3+the turn-on voltage of TH1+the turn-on voltage of TH2, i.e., 113+4+4=121 V; and when the common-mode surge voltage is in a falling edge, and drops to less than 877.8 V @ 100 V/s, the common-mode circuit in the first level protection circuit stops working, and the common-mode circuit in the second level protection circuit starts working so as to filter the common-mode surge voltage. In the case where the common-mode circuit in the first level protection circuit works, and the surge current is less than 150 mA, the TSS returns to a turned-off state, and at this moment, the common-mode circuit in the first level protection circuit is in a turned-off state; or, when the surge voltage is less than 70 V, the TVS returns to the turned-off state, and at this moment, the common-mode circuit in the first level protection circuit is in the turned-off state.

In summary, the surge protection circuit in FIG. 11 realizes the differential-mode surge protection and the common-mode surge protection on the protected circuit.

In one embodiment of the present invention, if a test of a higher surge voltage or a surge current is needed, some TVSs with higher power and TSSs with higher transient current peak value may be selected. For example, model AK3 of the TVS may endure surge currents of 3 kA 8/20 us, and some TSSs may endure surge currents of 5 kA 8/20 us.

One embodiment of the present invention provides a surge protection method based on the above-mentioned surge protection circuit, and the method may comprise:

connecting a protected circuit of a device in parallel to a first series-connected line in the surge protection circuit;

when it is detected that a differential-mode surge voltage appears at two ends of the first series-connected line, by using the first series-connected line of the surge protection circuit, absorbing the differential-mode surge voltage, and clamping a voltage of a backend connection circuit to a first voltage value; and when it is detected that a common-mode surge voltage appears at two ends of the first series-connected line to a ground end of the second series-connected line, respectively, by using the first series-connected line and the second series-connected line, absorbing the common-mode surge voltage, and reducing voltages to ground of the positive terminal and the negative terminal to a second voltage value.

In summary, the embodiments of the present invention may at least realize the following beneficial effects:

1. In the embodiments of the present invention, by using TVSs to form a first series-connected line and using TSSs to form a second series-connected line, when a differential-mode surge voltage appears at the two ends of the first series-connected line, a high impedance at the two ends of the first series-connected line may be rapidly converted into a low impedance according to the characteristics of the TVS so as to absorb surge power and to clamp a voltage of a backend connection circuit to a first voltage value, and when a common-mode surge voltage appears at the two ends of the first series-connected line to the ground end of the second series-connected line, respectively, the common-mode surge voltage is absorbed, and voltages to ground of the positive terminal and the negative terminal are reduced to a second voltage value so as to provide more effective surge protection.

2. In the embodiments of the present invention, the surge protection capability is improved, and by selecting models of the TVS and the TSS, the surge protection may rise to at least 6 KV.

3. In the embodiments of the present invention, by selecting models of the TVS and the TSS, an insulated voltage capability is retained on the common-mode circuit, which may satisfy an insulation test of 500 V AC/700 V DC.

4. In the embodiments of the present invention, selecting models of the TVS and the TSS enables the differential-mode circuit to have a relatively small leakage current so as to reduce the effect on the accuracy on the differential-mode circuit.

It should be noted that relationship terms herein such as first and second are merely used to differentiate an entity or operation from another entity or operation, not necessarily requiring or indicating that such actual relationship or order exists between these entities or operations. Furthermore, the terms "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "comprising a . . . " does not, without more constraints, preclude the existence of additional identical elements in the process, method, article, or apparatus that includes the element.

Those skilled in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a read only memory (ROM), a random access memory (RAM), a magnetic disk, or a compact disc-read only memory.

Finally, it should be noted that: what is described above represents merely preferred embodiments of the present invention, and is merely for illustration of the technical solutions of the present invention, but is not for limiting the protection scope of the present invention. All the modifications, equivalent replacements, and improvements made within the spirit and principle of the present invention are encompassed within the protection scope of the present invention.

The invention claimed is:

1. A surge protection circuit, comprising:
   a first series-connected line and at least one second series-connected line, wherein,
   the first series-connected line is formed by at least two transient voltage suppressors (TVSs) connected in series, one end of the first series-connected line being connected to a positive terminal, and another end of the first series-connected line being connected to a negative terminal;
   the second series-connected line is formed by at least one thyristor surge suppressor (TSS), one end of the second series-connected line being connected between the at least two TVSs in the first series-connected line, and another end of the second series-connected line being grounded;
   the first series-connected line is connected in parallel to a protected circuit of a device;
   wherein, in response to a differential-mode surge voltage appearing at the two ends of the first series-connected line, by using the first series-connected line, the differential-mode surge voltage is absorbed, and a voltage of a backend connection circuit is clamped to a first voltage value; and
   wherein, in response to a common-mode surge voltage appearing at the two ends of the first series-connected line to the ground end of the second series-connected line, respectively, by using the first series-connected line and the second series-connected line, the common-mode surge voltage is absorbed, and voltages to ground of the positive terminal and the negative terminal are respectively reduced to a second voltage value, wherein,
   any one of the TVSs satisfies one or more of the following:
   power is not less than a product of a clamping voltage of the TVS and a transient current peak value in a surge condition;
   the clamping voltage is less than a first predetermined value;
   a breakdown voltage exceeds a maximum working voltage of the protected circuit by a second predetermined value; and
   leakage current is relatively less than a third redetermined value and wherein
   any one of the TSSs satisfies one or more of the following:
   a peak turn-on current is greater than a surge current;
   a peak turn-off voltage is eater than a fourth redetermined value; and
   a switch voltage is relatively less than a fifth predetermined value.

2. The surge protection circuit of claim 1, wherein the at least one second series-connected line includes two second series-connected lines, wherein all TSSs on the two second series-connected lines are connected in series on the first series-connected line; and
   wherein the first series-connected line is further connected in parallel to at least one TVS.

3. The surge protection circuit of claim 2, further comprising:
   a differential-mode circuit, including the at least one TVS connected in parallel to the first series-connected line, wherein, in response to detecting that the differential-mode surge voltage is relatively greater than a breakdown voltage of the at least one TVS on the differential-mode circuit, the differential-mode circuit absorbing the differential-mode surge voltage, and clamping the voltage of a backend connection circuit to the first voltage value; and
   a common-mode circuit, including from one end of the first series-connected line to a TVS of an upper portion of the first series-connected line to one of the two second series-connected lines, and from the another end of the first series-connected line to a TVS of a lower portion of the first series-connected line to another one of the two second series-connected lines, wherein, in response to detecting that the common-mode surge voltage is relatively greater than a sum of breakdown voltages of the TVSs and switch voltages of the TSSs on the common-mode circuit, the common-mode circuit absorbing the common-mode surge voltage, and relatively reducing the voltages to ground of the positive terminal and the negative terminal to the second voltage value.

4. The surge protection circuit of claim 2, further comprising:
   at least two filter circuits, wherein
   the at least two filter circuits are respectively connected to the respective two ends of the first series-connected line, connected in parallel to the protected circuit of the device; and wherein the at least two filter circuits are connected and are grounded.

5. The surge protection circuit of claim 4, wherein,
   the at least two filter circuits are configured to, in response to detecting that a common-mode surge voltage appears at the two ends of the first series-connected line, filter the common-mode surge voltage that appears.

6. The surge protection circuit of claim 1, wherein the at least one second series-connected lines includes one second series-connected line, and wherein all TSSs on the one second series-connected line are not connected in series on the first series-connected line.

7. The surge protection circuit of claim 6, further comprising:
   a differential-mode circuit, comprising the first series-connected line, wherein, in response to detecting that the differential-mode surge voltage is relatively greater than breakdown voltages of all TVSs on the first series-connected line, the differential-mode circuit absorbing the differential-mode surge voltage, and clamping the voltage of the backend connection circuit to the first voltage value; and
   a common-mode circuit, comprising from one end of the first series-connected line to a TVS of an upper portion of the first series-connected line to the one second series-connected line, and from another end of the first series-connected line to a TVS of a relatively lower portion of the first series-connected line to the one second series-connected line, and wherein, in response to detecting that the common-mode surge voltage is relatively greater than a sum of breakdown voltages of the TVSs and switch voltages of the TSSs on the common-mode circuit, the common-mode circuit absorbing the common-mode surge voltage, and relatively reducing the voltages to ground of the positive terminal and the negative terminal to the second voltage value.

8. The surge protection circuit of claim 6, wherein the first series-connected line is further connected in parallel to at least one TVS.

9. The surge protection circuit of claim 8, comprising:
a differential-mode circuit, comprising the at least one TVS connected in parallel to the first series-connected line, wherein, in response to detecting that the differential-mode surge voltage is relatively greater than a breakdown voltage of the at least one TVS on the differential-mode circuit, the differential-mode circuit absorbing the differential-mode surge voltage, and clamping the voltage of the backend connection circuit to the first voltage value; and
a common-mode circuit, comprising from one end of the first series-connected line to a TVS of an upper portion of the first series-connected line to the one second series-connected line, and from another end of the first series-connected line to a TVS of a relatively lower portion of the first series-connected line to the one second series-connected line, wherein, in response to detecting that the common-mode surge voltage is relatively greater than a sum of breakdown voltages of the TVSs and switch voltages of the TSSs on the common-mode circuit, the common-mode circuit absorbing the common-mode surge voltage, and reducing the voltages to ground of the positive terminal and the negative terminal to the second voltage value.

10. The surge protection circuit of claim 6, further comprising:
at least two filter circuits, wherein
the at least two filter circuits are respectively connected to the respective two ends of the first series-connected line, connected in parallel to the protected circuit of the device; and wherein the at least two filter circuits are connected and are grounded.

11. The surge protection circuit of claim 10, wherein,
the at least two filter circuits are configured to, in response to detecting that a common-mode surge voltage appears at the two ends of the first series-connected line, filter the common-mode surge voltage that appears.

12. The surge protection circuit of claim 1, further comprising:
at least two filter circuits, wherein
the at least two filter circuits are respectively connected to the respective two ends of the first series-connected line, connected in parallel to the protected circuit of the device; and wherein the at least two filter circuits are connected and are grounded.

13. The surge protection circuit of claim 12, wherein,
the at least two filter circuits are configured to, in response to detecting that a common-mode surge voltage appears at the two ends of the first series-connected line, filter the common-mode surge voltage that appears.

14. A surge protection method, comprising:
connecting a protected circuit of a device in parallel to a first series-connected line in the surge protection circuit;
absorbing, in response to detecting that a differential-mode surge voltage appears at two ends of the first series-connected line, by using the first series-connected line of the surge protection circuit, the differential-mode surge voltage, and clamping a voltage of a backend connection circuit to a first voltage value; and
absorbing, in response to detecting that a common-mode surge voltage appears at two ends of the first series-connected line to a ground end of a second series-connected line in the surge protection circuit, respectively, by using the first series-connected line and the second series-connected line, the common-mode surge voltage, and reducing voltages to ground of the positive terminal and the negative terminal to a second voltage value, wherein,
the first series-connected line includes at least two transient voltage suppressors (TVSs) and any one of the TVSs satisfies one or more of the following:
power is not less than a product of a clamping voltage of the TVS and a transient current peak value in a surge condition;
the clamping voltage is less than a first predetermined value;
a breakdown voltage exceeds a maximum working voltage of the protected circuit by a second predetermined value; and
leakage current is relatively less than a third predetermined value, and wherein,
the second series-connected line includes at least one thyristor surge suppressor (TSS) and any one of the TSSs satisfies one or more of the following:
a peak turn-on current is greater than a surge current;
a peak turn-off voltage is greater than a fourth predetermined value; and a switch voltage is relatively less than a fifth predetermined value.

* * * * *